United States Patent
Wang

(10) Patent No.: US 12,517,241 B2
(45) Date of Patent: Jan. 6, 2026

(54) RADAR DETECTOR WITH VELOCITY PROFILING

(71) Applicant: GM Cruise Holdings LLC, San Francisco, CA (US)

(72) Inventor: Shaogang Wang, Pittsburgh, PA (US)

(73) Assignee: GM Cruise Holdings LLC, San Francisco, CA (US)

( * ) Notice: Subject to any disclaimer, the term of this patent is extended or adjusted under 35 U.S.C. 154(b) by 482 days.

(21) Appl. No.: 17/562,541

(22) Filed: Dec. 27, 2021

(65) Prior Publication Data

US 2023/0280457 A1   Sep. 7, 2023

(51) Int. Cl.

| G01S 13/58 | (2006.01) |
|---|---|
| G01S 13/72 | (2006.01) |
| G01S 13/931 | (2020.01) |
| G01S 17/58 | (2006.01) |
| G01S 17/931 | (2020.01) |

(52) U.S. Cl.
CPC .......... *G01S 13/589* (2013.01); *G01S 13/723* (2013.01); *G01S 13/931* (2013.01); *G01S 17/58* (2013.01); *G01S 17/931* (2020.01); *G01S 2013/93185* (2020.01); *G01S 2013/9323* (2020.01)

(58) Field of Classification Search
CPC .... G01S 13/589; G01S 13/723; G01S 13/931; G01S 2013/93185; G01S 2013/9323; G01S 7/4808; G01S 2013/9319; G01S 17/58; G01S 17/931; G01S 2013/9318
See application file for complete search history.

(56) References Cited

U.S. PATENT DOCUMENTS

| 10,279,786 | B2 * | 5/2019 | Prasad | G08G 1/16 |
|---|---|---|---|---|
| 2018/0261095 | A1 * | 9/2018 | Qiu | H04W 4/023 |
| 2020/0218913 | A1 * | 7/2020 | Unnikrishnan | G01S 13/867 |
| 2020/0278435 | A1 * | 9/2020 | Wang | G01S 13/66 |
| 2021/0255307 | A1 * | 8/2021 | Bongio Karrman | G01S 13/723 |
| 2022/0214444 | A1 * | 7/2022 | Das | G01S 17/50 |
| 2023/0046274 | A1 * | 2/2023 | Chen | G01S 7/417 |
| 2024/0045052 | A1 * | 2/2024 | Traa | G01S 13/93 |

* cited by examiner

*Primary Examiner* — Matthew M Barker
(74) *Attorney, Agent, or Firm* — Honigman LLP; Matthew H. Szalach; Jonathan P. O'Brien

(57) ABSTRACT

The present disclosure is directed to combining the strengths of different methods of analyzing collected sensor data to reduce the risk of an autonomous vehicle (AV) impacting an object. This may include combining data from sets of data that track movement of objects over time with instantaneously received sensor data based on a series of steps that include accessing data that tracks the motion of objects in the field of view of a sensing apparatus, receiving current sensor data that includes a component of current or instantaneous object motion, and generating a forecast of future motion of that object. This forecast may be based on an analysis that compares the data that tracks the motion of objects with the current sensor data as part of a process that generates a risk probability. When the risk probability meets or exceeds a threshold level, a corrective action may be initiated.

14 Claims, 5 Drawing Sheets

RADAR DETECTOR WITH VELOCITY PROFILING

BACKGROUND

1. Technical Field

The present disclosure is generally related to evaluating sensor data from different perspectives. More specifically, the present disclosure is directed at combining sensor processing techniques in ways that facilitate the forecasting of object trajectories.

2. Introduction

Autonomous vehicles (AVs) are vehicles having computers and control systems that perform driving and navigation tasks that are conventionally performed by a human driver. As AV technologies continue to advance, they will be increasingly used to improve transportation efficiency and safety. As such, AVs will need to perform many of the functions that are conventionally performed by human drivers, such as performing navigation and routing tasks necessary to provide safe and efficient transportation. Such tasks may require the collection and processing of large quantities of data using various sensor types, including but not limited to cameras and/or Light Detection and Ranging (LiDAR) sensors, and radio detection and ranging (radar) elements disposed on the AV.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

DETAILED DESCRIPTION

Figure 1:
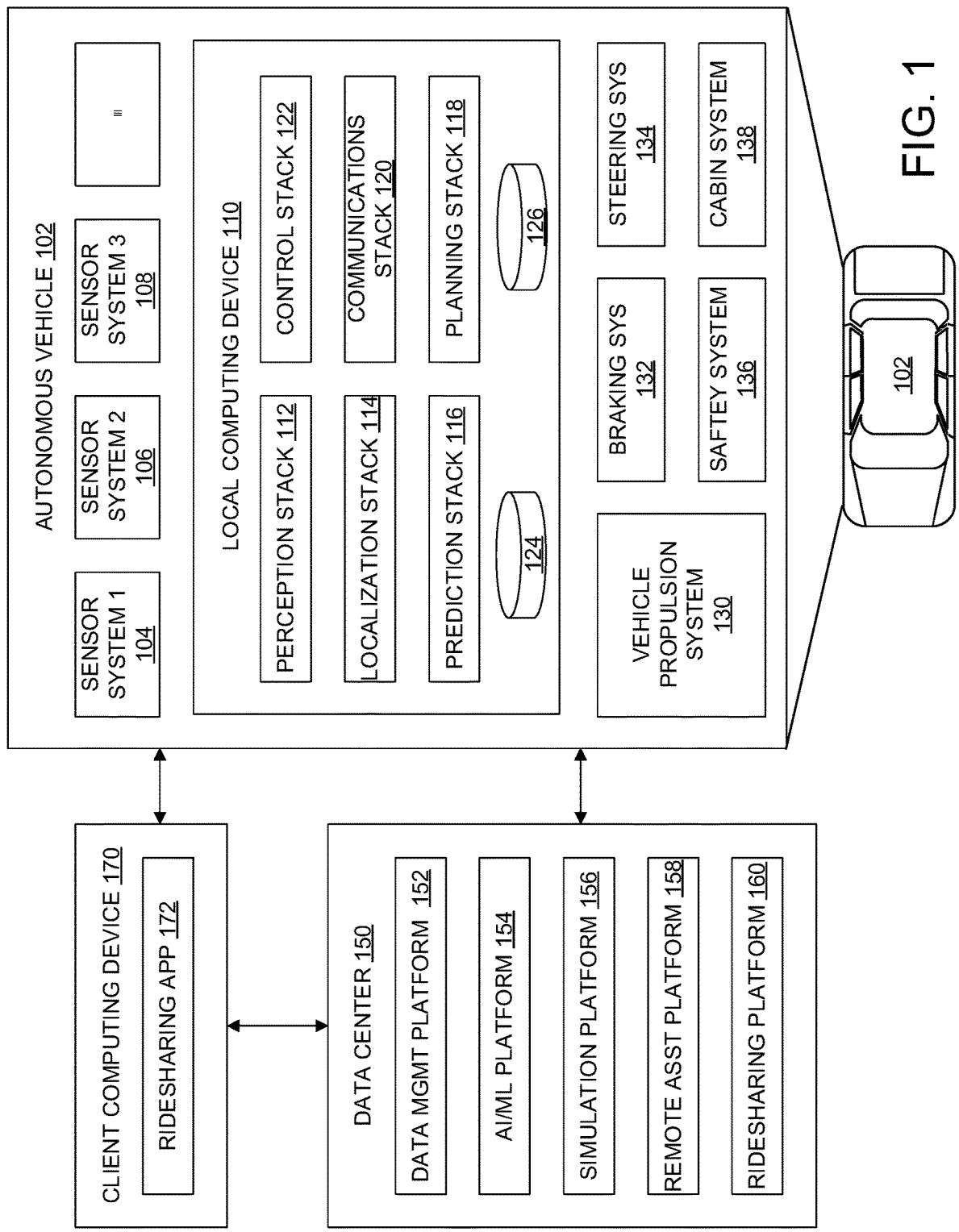
FIG. 1 illustrates an example of a system for managing one or more Autonomous Vehicles (AVs), in accordance with some aspects of the present technology.

The present disclosure is directed to combining the strengths of different methods of analyzing collected sensor data to reduce/mitigate the risk of an autonomous vehicle (AV) impacting an object. This may include combining data from sets of data that track movement of objects over time with instantaneously received sensor data based on a series of steps that include accessing data that tracks the motion of objects in the field of view of a sensing apparatus, receiving current sensor data that includes a component of current or instantaneous object motion, and generating a forecast of future motion of that object. This forecast may be based on an analysis that compares the data that tracks the motion of objects with the current sensor data as part of a process that generates a risk probability. When the risk probability meets or exceeds a threshold level, a corrective action may be initiated. Methods of the present disclosure may be performed at least in part by a processor executing instructions out of a memory.

As described herein, one aspect of the present technology is the gathering and use of data available from various sources to improve quality and experience. The present disclosure contemplates that, in some instances, this gathered data may include personal information. The present disclosure contemplates that the entities involved with such personal information respect and value privacy policies and practices.

Sensing apparatus used in an AV may receive data from radio detection and ranging (radar) sensors, camera sensors, Light Detection and Ranging (LiDAR) sensors or a combination of both. A first way that sensor data is used is to collect and immediately evaluate sensor data to make a determination. For example, sensor data may be received that indicates that an object is located in a roadway immediately in front of a vehicle, and this information may be used to apply the brakes of a vehicle to avoid hitting the object. A second way that sensor data may be used is to accumulate sensor data, to evaluate that sensor data, and to use that sensor data to identify and track objects over time. In certain instances, the first way of using the sensor data is referred to as a top down use of sensor data and the second way of using sensor data is referred to as a bottom up use of sensor data.

A strength of the top down approach of sensor data analysis is that it has the ability to identify factors that may increase risk associated with movement of a vehicle very quickly, potentially using data that has a fairly high degree of accuracy or resolution. A limitation of the top down approach of processing sensor data is that this type of processing occurs very quicky (e.g., over short spans of time) and without the ability of being able to review movement data associated with objects over longer periods of time. A strength to the bottom up approach is that it tracks movement of objects over longer periods of time. A weakness of this bottom up approach relates to a limited ability to forecast rapid changes in movement of an object, especially when that object has recently entered the field of view of an AV sensing apparatus.

New apparatuses and methods are needed to leverage the strengths of different methods for processing sensor data.

FIG. 1 illustrates an example of an AV management system 100. One of ordinary skill in the art will understand that, for the AV management system 100 and any system discussed in the present disclosure, there can be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 100 includes an AV 102, a data center 150, and a client computing device 170. The AV 102, the data center 150, and the client computing device 170 can communicate with one another over one or more networks (not shown), such as a public network (e.g., the Internet, an Infrastructure as a Service_

(IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 102 can navigate roadways without a human driver based on sensor signals generated by multiple sensor systems 104, 106, and 108. The sensor systems 104-108 can include different types of sensors and can be arranged about the AV 102. For instance, the sensor systems 104-108 can comprise Inertial Measurement Units (IMUs), cameras (e.g., still image cameras, video cameras, etc.), light sensors (e.g., LIDAR systems, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 104 can be a camera system, the sensor system 106 can be a LIDAR system, and the sensor system 108 can be a RADAR system. Other embodiments may include any other number and type of sensors.

The AV 102 can also include several mechanical systems that can be used to maneuver or operate the AV 102. For instance, the mechanical systems can include a vehicle propulsion system 130, a braking system 132, a steering system 134, a safety system 136, and a cabin system 138, among other systems. The vehicle propulsion system 130 can include an electric motor, an internal combustion engine, or both. The braking system 132 can include an engine brake, brake pads, actuators, and/or any other suitable componentry configured to assist in decelerating the AV 102. The steering system 134 can include suitable componentry configured to control the direction of movement of the AV 102 during navigation. The safety system 136 can include lights and signal indicators, a parking brake, airbags, and so forth. The cabin system 138 can include cabin temperature control systems, in-cabin entertainment systems, and so forth. In some embodiments, the AV 102 might not include human driver actuators (e.g., steering wheel, handbrake, foot brake pedal, foot accelerator pedal, turn signal lever, window wipers, etc.) for controlling the AV 102. Instead, the cabin system 138 can include one or more client interfaces (e.g., Graphical User Interfaces (GUIs), Voice User Interfaces (VUIs), etc.) for controlling certain aspects of the mechanical systems 130-138.

The AV 102 can additionally include a local computing device 110 that is in communication with the sensor systems 104-108, the mechanical systems 130-138, the data center 150, and the client computing device 170, among other systems. The local computing device 110 can include one or more processors and memory, including instructions that can be executed by the one or more processors. The instructions can make up one or more software stacks or components responsible for controlling the AV 102; communicating with the data center 150, the client computing device 170, and other systems; receiving inputs from riders, passengers, and other entities within the AV's environment; logging metrics collected by the sensor systems 104-108; and so forth. In this example, the local computing device 110 includes a perception stack 112, a mapping and localization stack 114, a prediction stack 116, a planning stack 118, a communications stack 120, a control stack 122, an AV operational database 124, and an HD geospatial database 126, among other stacks and systems.

The perception stack 112 can enable the AV 102 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 104-108, the mapping and localization stack 114, the HD geospatial database 126, other components of the AV, and other data sources (e.g., the data center 150, the client computing device 170, third party data sources, etc.). The perception stack 112 can detect and classify objects and determine their current locations, speeds, directions, and the like. In addition, the perception stack 112 can determine the free space around the AV 102 (e.g., to maintain a safe distance from other objects, change lanes, park the AV, etc.). The perception stack 112 can also identify environmental uncertainties, such as where to look for moving objects, flag areas that may be obscured or blocked from view, and so forth. In some embodiments, an output of the prediction stack can be a bounding area around a perceived object that can be associated with a semantic label that identifies the type of object that is within the bounding area, the kinematic of the object (information about its movement), a tracked path of the object, and a description of the pose of the object (its orientation or heading, etc.).

The mapping and localization stack 114 can determine the AV's position and orientation (pose) using different methods from multiple systems (e.g., GPS, IMUs, cameras, LIDAR, RADAR, ultrasonic sensors, the HD geospatial database 122, etc.). For example, in some embodiments, the AV 102 can compare sensor data captured in real-time by the sensor systems 104-108 to data in the HD geospatial database 126 to determine its precise (e.g., accurate to the order of a few centimeters or less) position and orientation. The AV 102 can focus its search based on sensor data from one or more first sensor systems (e.g., GPS) by matching sensor data from one or more second sensor systems (e.g., LIDAR). If the mapping and localization information from one system is unavailable, the AV 102 can use mapping and localization information from a redundant system and/or from remote data sources.

The prediction stack 116 can receive information from the localization stack 114 and objects identified by the perception stack 112 and predict a future path for the objects. In some embodiments, the prediction stack 116 can output several likely paths that an object is predicted to take along with a probability associated with each path. For each predicted path, the prediction stack 116 can also output a range of points along the path corresponding to a predicted location of the object along the path at future time intervals along with an expected error value for each of the points that indicates a probabilistic deviation from that point.

The planning stack 118 can determine how to maneuver or operate the AV 102 safely and efficiently in its environment. For example, the planning stack 116 can receive the location, speed, and direction of the AV 102, geospatial data, data regarding objects sharing the road with the AV 102 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 102 from one point to another and outputs from the perception stack 112, localization stack 114, and prediction stack 116. The planning stack 118 can determine multiple sets of one or more mechanical operations that the AV 102 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 118 can select from multiple backup plans to carry out. For example, while preparing to change lanes to turn right at an intersection, another vehicle may aggressively cut into the destination lane, making the lane change unsafe. The planning stack 118 could have already determined an alternative plan for such an event. Upon its occurrence, it could help direct the AV 102 to go around the block instead of blocking a current lane while waiting for an opening to change lanes.

The control stack 122 can manage the operation of the vehicle propulsion system 130, the braking system 132, the steering system 134, the safety system 136, and the cabin system 138. The control stack 122 can receive sensor signals from the sensor systems 104-108 as well as communicate with other stacks or components of the local computing device 110 or a remote system (e.g., the data center 150) to effectuate operation of the AV 102. For example, the control stack 122 can implement the final path or actions from the multiple paths or actions provided by the planning stack 118. This can involve turning the routes and decisions from the planning stack 118 into commands for the actuators that control the AV's steering, throttle, brake, and drive unit.

The communication stack 120 can transmit and receive signals between the various stacks and other components of the AV 102 and between the AV 102, the data center 150, the client computing device 170, and other remote systems. The communication stack 120 can enable the local computing device 110 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communication stack 120 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 126 can store HD maps and related data of the streets upon which the AV 102 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal u-turn lanes; permissive or protected only right turn lanes; etc.). The traffic controls lane can include geospatial information of traffic signal lights, traffic signs, and other road objects and related attributes.

The AV operational database 124 can store raw AV data generated by the sensor systems 104-108, stacks 112-122, and other components of the AV 102 and/or data received by the AV 102 from remote systems (e.g., the data center 150, the client computing device 170, etc.). In some embodiments, the raw AV data can include HD LIDAR point cloud data, image data, RADAR data, GPS data, and other sensor data that the data center 150 can use for creating or updating AV geospatial data or for creating simulations of situations encountered by AV 102 for future testing or training of various machine learning algorithms that are incorporated in the local computing device 110.

The data center 150 can be a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and so forth. The data center 150 can include one or more computing devices remote to the local computing device 110 for managing a fleet of AVs and AV-related services. For example, in addition to managing the AV 102, the data center 150 may also support a ridesharing service, a delivery service, a remote/roadside assistance service, street services (e.g., street mapping, street patrol, street cleaning, street metering, parking reservation, etc.), and the like.

The data center 150 can send and receive various signals to and from the AV 102 and the client computing device 170. These signals can include sensor data captured by the sensor systems 104-108, roadside assistance requests, software updates, ridesharing pick-up and drop-off instructions, and so forth. In this example, the data center 150 includes a data management platform 152, an Artificial Intelligence/Machine Learning (AI/ML) platform 154, a simulation platform 156, a remote assistance platform 158, and a ridesharing platform 160, among other systems.

The data management platform 152 can be a "big data" system capable of receiving and transmitting data at high velocities (e.g., near real-time or real-time), processing a large variety of data and storing large volumes of data (e.g., terabytes, petabytes, or more of data). The varieties of data can include data having different structured (e.g., structured, semi-structured, unstructured, etc.), data of different types (e.g., sensor data, mechanical system data, ridesharing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 150 can access data stored by the data management platform 152 to provide their respective services.

The AI/ML platform 154 can provide the infrastructure for training and evaluating machine learning algorithms for operating the AV 102, the simulation platform 156, the remote assistance platform 158, the ridesharing platform 160, the cartography platform 162, and other platforms and systems. Using the AI/ML platform 154, data scientists can prepare data sets from the data management platform 152; select, design, and train machine learning models; evaluate, refine, and deploy the models; maintain, monitor, and retrain the models; and so on.

The simulation platform 156 can enable testing and validation of the algorithms, machine learning models, neural networks, and other development efforts for the AV 102, the remote assistance platform 158, the ridesharing platform 160, the cartography platform 162, and other platforms and systems. The simulation platform 156 can replicate a variety of driving environments and/or reproduce real-world scenarios from data captured by the AV 102, including rendering geospatial information and road infrastructure (e.g., streets, lanes, crosswalks, traffic lights, stop signs, etc.) obtained from the cartography platform 162; modeling the behavior of other vehicles, bicycles, pedestrians, and other dynamic elements; simulating inclement weather conditions, different traffic scenarios; and so on.

The remote assistance platform 158 can generate and transmit instructions regarding the operation of the AV 102. For example, in response to an output of the AI/ML platform 154 or other system of the data center 150, the remote assistance platform 158 can prepare instructions for one or more stacks or other components of the AV 102.

The ridesharing platform 160 can interact with a customer of a ridesharing service via a ridesharing application 172 executing on the client computing device 170. The client computing device 170 can be any type of computing system, including a server, desktop computer, laptop, tablet, smartphone, smart wearable device (e.g., smartwatch, smart eyeglasses or other Head-Mounted Display (HMD), smart ear pods, or other smart in-ear, on-ear, or over-ear device, etc.), gaming system, or other general purpose computing device for accessing the ridesharing application 172. The client computing device 170 can be a customer's mobile computing device or a computing device integrated with the AV 102 (e.g., the local computing device 110). The ridesharing platform 160 can receive requests to pick up or drop off from the ridesharing application 172 and dispatch the AV 102 for the trip.

Methods of the present disclosure may separate an area around the radar apparatus into a grid pattern that includes a plurality of cells. Objects tracked by one type of sensing apparatus (e.g. a camera and/or LiDAR apparatus) may be associated with particular cells of the grid and a processor that processes radar signal data may only process radar signals associated with the particular cells of the grid.

Figure 2:
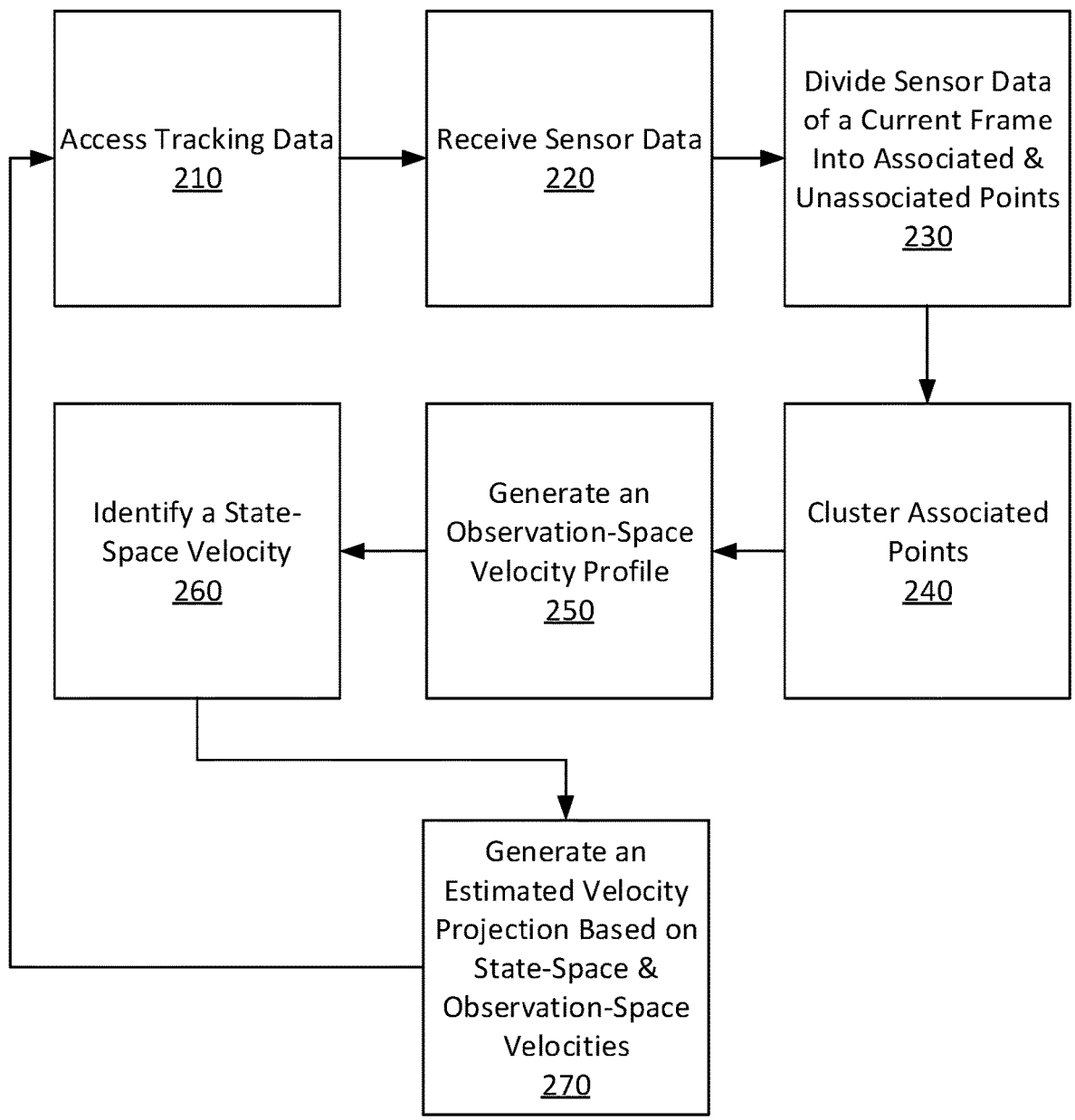
FIG. 2 illustrates a series of steps that may be used to evaluate and combine prior object movement data with data associated with current or recent kinematic object data, according to some aspects of the disclosed technology.

FIG. 2 illustrates a series of steps that may be used to evaluate and combine prior object movement data with data associated with current or recent kinematic object data. FIG. 2 begins with step 210 where tracking data is accessed. This tracking data may include information that tracks the motion of objects in front of or around a vehicle over a time span that is longer than a time required to acquire one or a few samples of object related data from a sensor. For example, this tracking data may track motion of an object over a time span longer than a few acquisition frames of a radar device. This tracking data may be information that associated object (or object labels) with movement of those objects that was tracked by one or more types of sensors. The tracking data may be associated with information received from a radar apparatus, a camera, or a LiDAR apparatus or combination of these types of apparatuses. The tracking data may include information that identifies or from which can be used to identify a velocity or a pattern of motion of objects around a vehicle. Here a processor executing instructions out of a memory at a sensing apparatus may access the tracking data. Current or instantaneous motion data discussed herein may be data that was acquired within a time span associated with the transmission and receipt of one or more sets of radar data before motion associated with that current motion data has been incorporated into the tracking data. Furthermore, a time frame of a radar apparatus may correspond to a time that spans the receipt of a first set of reflected radar pulses and the receipt of a second set of reflected radar pulses. This instantaneous motion data may be data that is received at a latest measurement time (i.e., circle) that has not yet been incorporated or fused into the tracked data. Tracking data is historical data that may be multi-modal data, such as camera data, LiDAR data, and/or radar data. This tracking data may describe motion of a set of tracked objects.

Next, in step 220 sensor data is received by the sensing apparatus that corresponds to current kinematics of objects in the field of view of the sensing apparatus. The data received in step 220 may have been received by the sensing apparatus after the sensing apparatus transmitted a radar signal and after that transmitted radar signal has been reflected off objects in the field of view of the radar. Reflected radar signals may be received by an antenna of a radar device that includes electronic components (analog and/or digital) that may perform functions associated with synchronization, filtering, amplification, and conversion of signals to the digital domain (e.g., via an analog to digital converter). Once converted to the digital domain, the sensor data may be divided into sets of associated data points and sets of unassociated data points in step 230 of FIG. 2. These associated points may be points of data collected by the radar that appear to be reflected off from a tracked object provided by the tracking data accessed in step 210. Unassociated points may be radar data points that are not or have not yet been associated with an object.

After step 230, the associated points of step 230 may be clustered in step 240. Each clustered set of points may be points that represent reflections of radar energy off different parts of an object, such as a headlamp of a motorcycle, a driver of the motorcycle, and the rear wheel of the motorcycle. While FIG. 2 includes step 230 and step 240, functions of associating the data points and the clustering of points may be performed in a single step. Each cluster of points may be associated with a particular object, where each point in a cluster may be associated with a different part of that particular object. A cluster may include data that describes a track of an object or some other object-level description of that object. An observation-space velocity profile may then be generated in step 250. This velocity profile may be generated from the tracking data access in step 210 and this velocity profile may include vectors of motion for each object in the field of view of a sensing apparatus. These motion vectors of the velocity profile may include a location, a direction, and a speed identified from the tracking data. This identification may be based on the execution of instructions of a set of "observation model" program code by a processor. This observational model program code may include instructions tailored to review data after that data has been acquired and incorporated tracking data. For example, a time required to update more recently received data into this tracking data may span five or more radar time frames. In certain instances, this time span may be on the order of 100 to 200 milliseconds (ms).

Next, in step 260 a state-space velocity may be identified. This state-space velocity may have been generated by analyzing the points clustered in step 240 of FIG. 2. This state-space velocity may be an instantaneous or a current measured velocity of an object in the view of the sensing apparatus. In certain instances, at least two sets of radar data must be associated with an object before the state-space velocity is identified. In other instances, a single set of received radar data combined with data from the tracked data may be used to identify this state-space velocity. The predicted velocity profile from a tracked object may have been identified by a processor executing instructions of a set of "measurement model" program code that maps track state space to the observation space, i.e., velocity profile. The instructions of the measurement model program code may identify one or more of a linear motion or a rotational motion of an object. Alternatively, this state-space velocity may be identified by comparing at least two different sets of current or nearly instantaneously received data.

After both the observation-space velocity profile and the state-space velocity have been identified, an estimated velocity projection may be made in step 270 of FIG. 2. The state-space velocity may be included in the data that tracks object motion and, as mentioned above, this tracking data may be historical data associated with multiple modes/ modalities of operation (e.g., camera, LiDAR, and/or radar). The instructions of the measurement model program code is directed to identifying motion components in three-dimensions that include a linear motion and in a rotational motion when the motion of an object has or is likely to have movement in both a linear direction and in a rotational direction. The vectors of the observational-space velocity profile and the motions of the state-space velocity may be combined in step 270 to forecast a speed and direction that particular objects in the field of view of the sensing apparatus may move. These forecasts may be based on a statistical analysis, where weighting factors may be associated with observational-space velocity profile data and state-space velocity data using techniques similar to those used in Kalman filtering. Since these forecasts are generated by combining information associated with tracking data (observational-space velocity data) and with current or instantaneous data (state-space velocity data), the methods used to generate these forecasts are an enhanced form of Kalman filtering (EKF). In certain instances, these weighting factors may be independent of variance factors associated with any of a probability, an estimated error factor, or an uncertainty factor. A velocity profile may include a succinct representation that captures velocity information from observed data. These weighting factors may be pre-defined or may be dynamically generated based on a function that reviews environmental changes. In such instances, weighting factors may be set by a manufacturer of a sensing apparatus and the variance factors may be associated with an environment where an autonomous vehicle (AV) is driving. Weighting factors may be set based on information received from a manufacturer of a sensing apparatus when the AV is driving in the real-world. This could be accomplished by updating variables based on data transmitted to the AV via a wireless data communication link, such as a cellular or other communication network. Variance factors may also be updated dynamically in a similar way.

This process may include associating an object with factors of position and velocity, where some of these factors are derived from tracking data and others are derived from current or instantaneous data. The method of combining observational-space and state-space data may include identifying a first set of factors from the tracking data (observational-space velocity data) and a second set factors of current or instantaneous data (state-space velocity data) form correlated sets of position and velocity where each of the first set of factors and the second set of factors may be assigned a variance that may be associated with a probability, an estimated error factor, or an uncertainty factor. This variance may correspond to a probability, an error or, an uncertainty of a position, direction, or velocity of an object. Evaluations may also be performed that identifies how tightly correlated the different sets of factors are. The more tightly correlated the two different sets of position and velocity factors are, will tend to lead to a higher confidence in correctly forecasting how an object will move in the immediate future. In certain instances, how tightly correlated the two different sets of position and velocity factors are may be identified by performing equations consistent with a covariance matrix.

Kalman type filtering equations may then be applied to forecast how an object will move from a first position to a second position at a velocity based on the different sets of factors and associated variances. These factors may include a probability factor, an error factor, or an uncertainty factor of a position, direction, or velocity of an object. Projections may then be made based on the filtering equations to forecast future motion of the object.

In an example, when a motorcycle is driving in front of an slightly to the right of an autonomous vehicle (AV), a sensor system of the AV may have been tracking motion of the motorcycle for several seconds or at lease long enough for the sensor system of the AV to have identified the motorcycle as an object that will be tracked. The sensor system may accumulate tracking data associated with movement of the motorcycle and an observation-space velocity profile generated from the tracking data may indicate that the motorcycle is driving 3 meters in front of the AV and 1 meter to the right of the AV in a direction that parallels movement of the AV. As long as the motorcycle remained 1 meter to the right of the AV, the probability that the AV can pass the motorcycle without impacting the motorcycle would be relatively high. If, however, the motorcycle was to move abruptly to the left, the AV could impact the motorcycle. Of course, the likelihood of the motorcycle making such a move may be very low, even so, the sensor system at the AV may not be able to account for such a probability. This could lead to a conventional AV sensing system being involved in an accident that could have been avoided when methods of the present disclosure were used.

A sensing apparatus that combines both observation-space velocity profile data and state-space velocity data may be used to reduce/mitigate the probability of the accident discussed above. Here, observation-space velocity profile data indicating that the motorcycle driving 3 meters in front of the AV and 1 meter to the right of the AV in a direction that parallels movement of the AV may be combined with state-space velocity data to identify a point in time when the probability of impacting the motorcycle increases. Such an increase in accident probability may be identified when evaluations of radar data received by the sensing apparatus identifies a change in a rotational velocity of the motorcycle toward the front of the AV. This identification could be made based on a movement of a front portion of the motorcycle toward the left and/or by identifying that a rear axle of the motorcycle has a component of rotational velocity toward the left. This could result in the AV sensing system sending a signal that results in the brakes of the AV being applied to avoid a possible collision with the motorcycle.

In certain instances, velocities of a tracked object may include different points that may move in a same direction with a same velocity or that may move in slightly different directions with different velocities. This is because an object may move only in one linear direction, may rotate, or may have motion that includes both linear and rotational components. Location data and velocity data associated with different points of an object may be used to identify whether an object is moving in a straight line, is rotating, or is moving in a direction while rotating. Rotational components of velocity may be identified by identifying that a first point and a second point of an object are moving with different velocities along vectors that may be in different directions.

Figure 3:
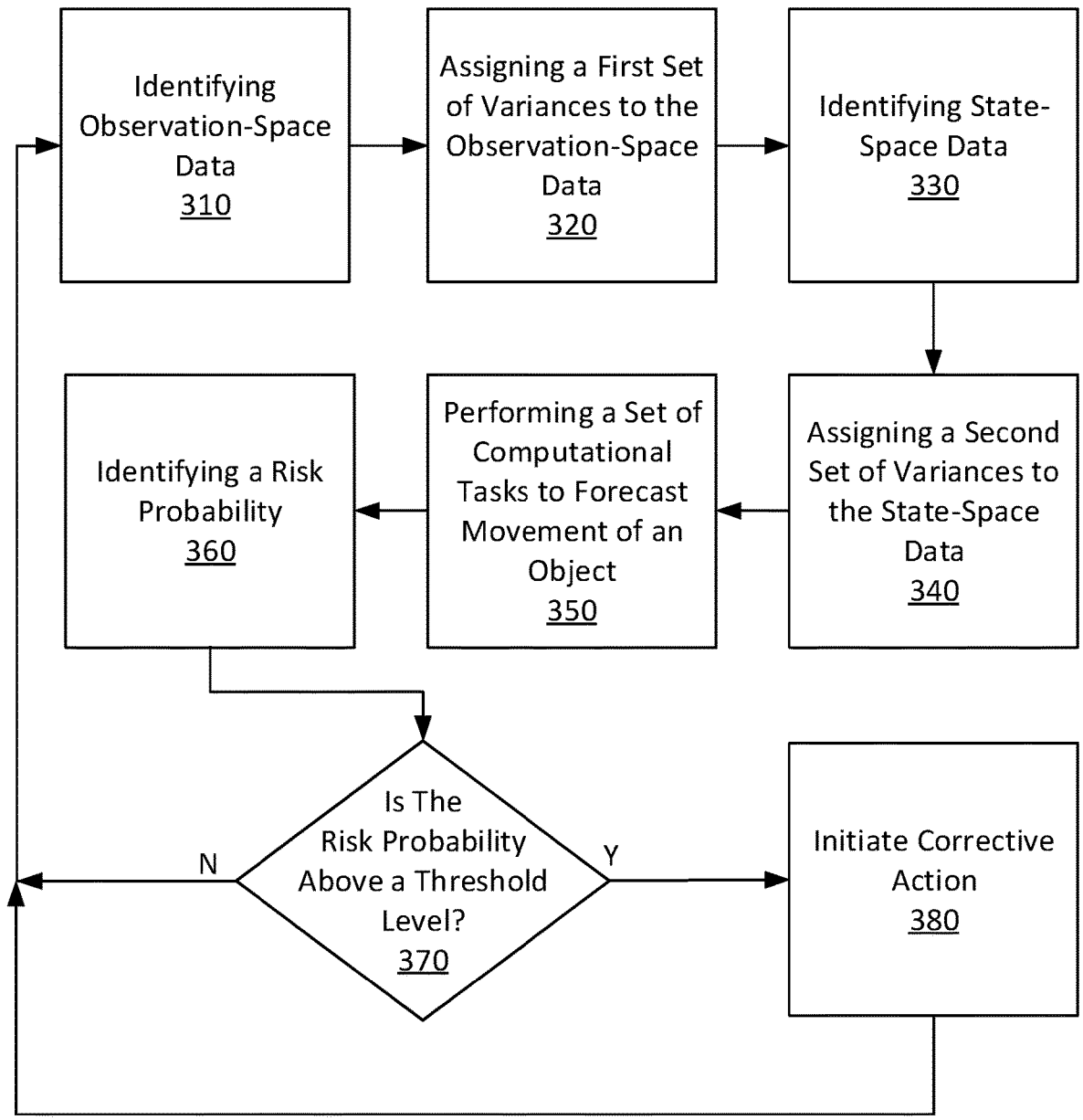
FIG. 3 illustrates a series of steps that may be performed by a sensing system of an AV.

FIG. 3 illustrates a set of steps that may be performed when risk probabilities are accessed by a processor of an autonomous vehicle (AV) sensing system. Step 310 of FIG. 3 is where observational-space data associated with an area around a vehicle are identified. The data identified in step 310 may include the same type of observational-space data discussed in respect to where the observation-space velocity profile is generated in step 250 of FIG. 2. This velocity profile may be generated from the tracking data and this velocity profile may include vectors of motion for each object in the field of view of a sensing apparatus. As mentioned above, these motion vectors of the velocity profile may include a location, a direction, and a velocity identified from the tracking data. This velocity profile may be identified based on the execution of instructions of a set of "observation model" program code by a processor. Next in step 320 of FIG. 3, a first set of variances may be associated to the observational space data. This first set of variances may include a probability factor, an error factor, or an uncertainty factor of a position, direction, or velocity of a tracked object. A processor executing instructions out of a memory at a sensing device may perform the steps of identifying observation-space data and state-space data and the related variances may be assigned by the processor based on an amount of noise (estimated, observed, and/or measured) affecting the sensing system or based on historical variance data. Noise and/or historical data associated with the observation-space data may be associated with environmental factors (e.g. smoke, fog, rain, or snow) or other factors (e.g. weighting factors discussed above).

State-space data may then be identified in step 330 and a second set of variances may be assigned to the state-space data in step 340 of FIG. 3. Here again this state-space data may include a position and velocity of the object that was identified based on currently received data. This may include identifying or estimating a measure of linear velocity and/or rotational velocity. This second set of variances may include a probability factor, an error factor, or an uncertainty factor of a position, direction, or velocity of an object. The processor executing instructions out of a memory at a sensing device may perform the steps of identifying observational-space data and state-space data and the related variances may be assigned by the processor based on an amount of noise (estimated, observed, and/or measured) affecting the sensing system or based on historical variance data. Here again, noise and/or historical data associated with the observation-space data may be associated with environmental factors (e.g. smoke, fog, rain, or snow) or other factors (e.g. weighting factors discussed above).

After the observation-space and state-space data and related variances have been identified, a set of computations may be performed in step 350 to forecast movement of an object. The computations performed in step 350 may be consistent with the Kalman type filtering equations discussed above applied to forecast how an object will move from a first position to a second position at a velocity. As discussed above, this may be based on different sets of factors and associated variances that again may include a probability factor, an error factor, or an uncertainty factor of a position, direction, or velocity of an object. These computations may include factors associated with observational-space and the state-space data discussed above. These computations may be performed by a processor executing instructions at the sensing apparatus.

When the processor identifies that the probability is above the threshold level at determination step 370, program flow may move to step 380 where a corrective action is initiated. This may include applying the brakes, as discussed above, or may result in a controller of the AV avoiding an object based on the forecasted direction and velocity of movement of the object. When the processor identifies that the probability is not above the threshold level at determination step 370, program flow may move back to step 310 where additional observation space data is identified.

Next, after these computations are performed, a risk probability may be identified or assigned to forecasted motion of the object. The processor executing instructions out of the memory may then identify whether the probability is above a threshold level in determination step 370. Risk probabilities may vary based on a type of object, relative velocities between objects (e.g. the AV and a moving object), or other factors.

Methods of the present disclosure may include steps that include identifying a first location of a first point of the first object based on the processing of the sets of the reflected radar signals, identifying a second location of the first point of the first object based on the processing of the sets of reflected radar signals, and identifying a first velocity to associated with the first object based on the first point of the first object moving from the first location of the first point to the second location of the first point in a time frame. These methods may also include the steps of identifying a first location of a second point of the first object based on the processing of the sets of the reflected radar signals, identifying a second location of the second point of the first object based on the processing of the sets of reflected radar signals, and identifying a second velocity with the first object based on the second point of the first object moving from the first location of the second point to the second location of the second point in the time frame.

A linear velocity may be identified when a first velocity of a first point of an object matches a second velocity of a second point of the object. A rotational velocity may be identified when the first velocity of the first point of the object is different from a velocity of the second point of the object that is different from the first velocity.

In certain instances, velocities of a tracked object may include different points that may move in a same direction with a same velocity or that may move in slightly different directions with different velocities. This is because an object may move only in one linear direction, may rotate, or may have motion that includes both linear and rotational components. Location data and velocity data associated with different points of an object may be used to identify whether an object is moving in a straight line, is rotating, or is moving in a direction while rotating. Rotational components of velocity may be identified by identifying that a first point and a second point of an object are moving with different velocities along vectors that may be in different directions.

Methods of the present disclosure may include steps that include identifying a first location of a first point of the first object based on the processing of the sets of the reflected radar signals, identifying a second location of the first point of the first object based on the processing of the sets of reflected radar signals, and identifying a first velocity to associated with the first object based on the first point of the first object moving from the first location of the first point to the second location of the first point in a time frame. These methods may also include the steps of identifying a first location of a second point of the first object based on the processing of the sets of the reflected radar signals, identifying a second location of the second point of the first object based on the processing of the sets of reflected radar signals, and identifying a second velocity with the first object based on the second point of the first object moving from the first location of the second point to the second location of the second point in the time frame.

A linear velocity may be identified when a first velocity of a first point of an object matches a second velocity of a second point of the object. A rotational velocity may be identified when the first velocity of the first point of the object is different from a velocity of the second point of the object that is different from the first velocity.

Figure 4:
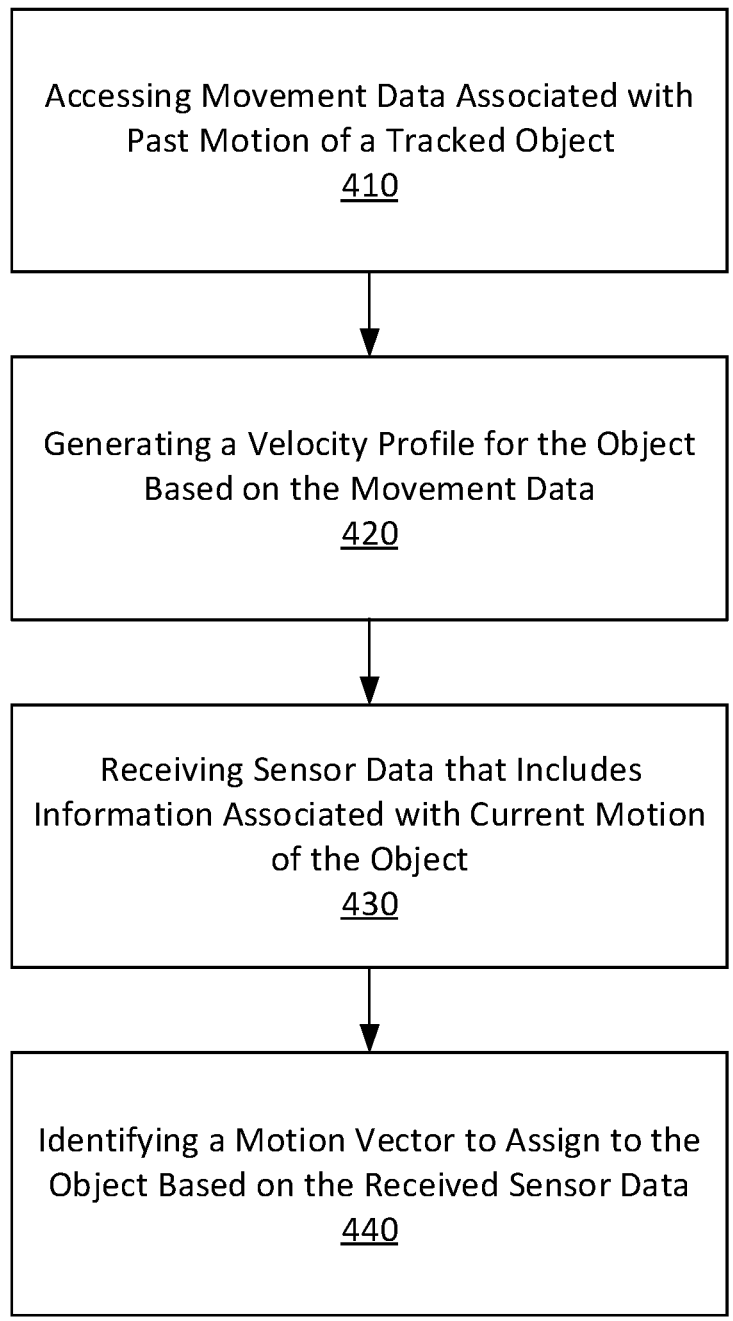
FIG. 4 illustrates a series of steps that may be used to organize information associated with past and current movement of an object such that a sensing system of an AV can forecast future movements of the object.

FIG. 4 illustrates a series of steps that may be used to organize information associated with the past and current movement of an object such that a sensing system of an autonomous vehicle (AV) can forecast future movements of the object. FIG. 4 beings with step 410 where movement data associated with the past motion of a tracked object are accessed. After step 410, a velocity profile for the object is generated in step 420 of FIG. 4. Here a processor may execute instructions out of a memory to generate the velocity profile based on the past movement data accessed in step 410.

Next, step 430 of FIG. 4 may include receiving sensor data that includes information associated with a current motion of the tracked object. This sensor data may have been received after a sensor senses data associated with the object. For example, a sensing apparatus may have transmitted a radar signal and received reflections of that radar signal. After the radar signal is received, that signal may be amplified, conditioned (e.g. filtered), and digitized (for example by an analog to digital converter—ADC) such that the processor may receive and perform evaluations on the data received from the ADC. The data received by the processor may be used to identify a motion vector to assign to the object based on the received sensor data (step 440). This may allow the processor to combine the past motion of the object with the current motion of the object to generate a forecast regarding future motion of the object. In certain instances, this forecasted motion may be assigned a probability and this probability may be used by the processor of the sensing apparatus to identify a corrective action that could be performed by the AV to reduce a risk of the AV impacting the object.

Figure 5:
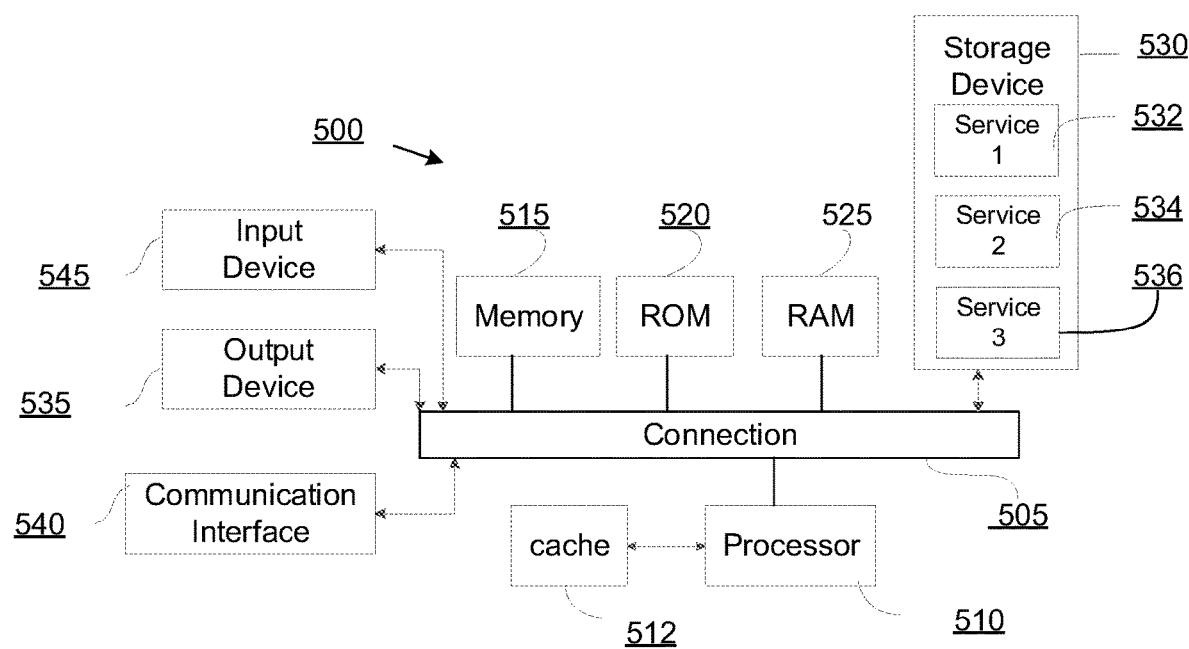
FIG. 5 shows an example of a computing system that may be used to implement at least some of the functions reviewed in the present disclosure, in accordance with some aspects of the present technology.

FIG. 5 shows an example of computing system 500 that may be used to implement at least some of the functions reviewed in the present disclosure. In certain instances, a computing device may be incorporated into a sensing apparatus or any component thereof in which the components of the system are in communication with each other using connection 505. Connection 505 can be a physical connection via a bus, or a direct connection into processor 510, such as in a chipset architecture. Connection 505 can also be a virtual connection, networked connection, or logical connection.

In some embodiments, computing system 500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 500 includes at least one processing unit (CPU or processor) 510 and connection 505 that couples various system components including system memory 515, such as read-only memory (ROM) 520 and random access memory (RAM) 525 to processor 510. Computing system 500 can include a cache of high-speed memory 512 connected directly with, in close proximity to, or integrated as part of processor 510.

Processor 510 can include any general purpose processor and a hardware service or software service, such as services 542, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communications interface 540, which can generally govern and manage the user input and system output. There is no restriction on operating on any particular hardware arrangement, and therefore the basic features here may easily be substituted for improved hardware or firmware arrangements as they are developed.

Storage device 530 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 530 can include software services, servers, services, etc., that when the code that defines such software is executed by the processor 510, it causes the system to perform a function. In some embodiments, a hardware service that performs a particular function can include the software component stored in a computer-readable medium in connection with the necessary hardware components, such as processor 510, connection 505, output device 535, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general-purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

What is claimed is:

1. An apparatus for mitigating risk associated with impacting a tracked object, the apparatus comprising:
   a memory; and
   a processor that executes instructions stored in the memory to:
      access movement data associated with past motion of the tracked object, wherein the movement data comprises at least one of radar sensor data or Light Detection and Ranging (LiDAR) sensor data;
      receive sensor data associated with current motion of the tracked object;
      cluster the received sensor data based on the tracked object;
      generate a velocity profile that includes a tracked direction and a tracked speed of the tracked object based on an evaluation of the movement data;
      generate state-space velocity data based on the clustered sensor data;
      weight the velocity profile and the state-space velocity data based at least in part on at least one of pre-defined factors or environmental changes;
      combine the weighted velocity profile and the state-space velocity data to determine a motion vector associated with the tracked object, wherein combining comprises performing a covariance matrix to determine a measure of correlation tightness between a first set of factors from the velocity profile and a second set of factors from the state-space velocity data, and wherein the measure of correlation tightness indicates a confidence level for forecasting future motion of the tracked object;
      forecast the future motion of the tracked object based on the determined motion vector;
      generate, based on the forecasted future motion and the confidence level, a risk probability associated with impacting the tracked object; and
      based on the risk probability satisfying a threshold, cause an autonomous vehicle control system to initiate a corrective action, wherein the corrective action comprises applying brakes of an autonomous vehicle (AV).

2. The apparatus of claim 1, wherein the risk probability is further based on a type of the tracked object.

3. The apparatus of claim 1, wherein a first velocity is associated with the motion vector.

4. The apparatus of claim 3, wherein a second velocity is associated with the motion vector, the first velocity is associated with linear movement, and the second velocity is associated with rotational movement of the tracked object.

5. The apparatus of claim 1, wherein forecasting the future motion of the tracked object is based on use of a Kalman filter.

6. A method for mitigating risk associated with impacting a tracked object, the method comprising:
   accessing movement data associated with past motion of the tracked object;
   receiving sensor data associated with current motion of the tracked object;
   clustering the received sensor data based on the tracked object;
   generating a velocity profile that includes a tracked direction and a tracked speed of the tracked object based on the movement data;
   generating state-space velocity data based on the clustered sensor data;
   weighting the velocity profile and the state-space velocity data based at least in part on at least one of pre-defined factors or environmental changes;
   combining the weighted velocity profile and the state-space velocity data to determine a motion vector to assign to the tracked object, wherein combining comprises performing a covariance matrix to determine a measure of correlation tightness between a first set of factors from the velocity profile and a second set of factors from the state-space velocity data, and wherein the measure of correlation tightness indicates a confidence level for forecasting future motion of the tracked object;
   forecasting the future motion of the tracked object based on the determined motion vector;
   generate, based on the forecasted future motion and the confidence level, a risk probability associated with impacting the tracked object; and
   based on the risk probability satisfying a threshold, causing an autonomous vehicle control system to initiate a corrective action, wherein the corrective action comprises applying brakes of an autonomous vehicle (AV).

7. The method of claim 6 wherein the risk probability is further based on a type of the tracked object.

8. The method of claim 6, further comprising identifying a first velocity to associate with the motion vector.

9. The method of claim 8, further comprising identifying a second velocity to associate with the motion vector, wherein the first velocity is associated with linear movement and the second velocity is associated with rotational movement of the tracked object.

10. The method of claim 6, further comprising evaluating the movement data and the sensor data using a Kalman filter.

11. A non-transitory computer-readable storage medium having embodied thereon a program executable by a processor to implement a method for mitigating risk associated with impacting a tracked object, the method comprising:

accessing movement data associated with past motion of the tracked object;

receiving sensor data associated with current motion of the tracked object;

clustering the received sensor data based on the tracked object;

generating a velocity profile that includes a tracked direction and a tracked speed of the tracked object based on the movement data;

generating state-space velocity data based on the clustered sensor data;

weighting the velocity profile and the state-space velocity data based at least in part on at least one of pre-defined factors or environmental changes;

combining the weighted velocity profile and the state-space velocity data to determine a motion vector to assign to the tracked object, wherein combining comprises performing a covariance matrix to determine a measure of correlation tightness between a first set of factors from the velocity profile and a second set of factors from the state-space velocity data, and wherein the measure of correlation tightness indicates a confidence level for forecasting future motion of the tracked object;

forecasting the future motion of the tracked object based on the determined motion vector;

generate, based on the forecasted future motion and the confidence level, a risk probability associated with impacting the tracked object; and based on the risk probability satisfying a threshold, causing an autonomous vehicle control system to initiate a corrective action, wherein the corrective action comprises applying brakes of an autonomous vehicle (AV).

12. The method of claim 11, wherein the risk probability is further based on a type of the tracked object.

13. The method of claim 11, further comprising identifying a first velocity to associate with the motion vector.

14. The method of claim 13, further comprising identifying a second velocity to associate with the motion vector, wherein the first velocity is associated with linear movement and the second velocity is associated with rotational movement of the tracked object.

* * * * *